US006425662B1

United States Patent
Teraoka et al.

(10) Patent No.: US 6,425,662 B1
(45) Date of Patent: Jul. 30, 2002

(54) INK SET, INK-JET RECORDING PROCESS, INK-JET RECORDING APPARATUS, AND METHOD FOR ALLEVIATING FORMATION OF SOLID WITHIN COMMON RECOVERY-SYSTEM UNIT

(75) Inventors: Hisashi Teraoka; Shinya Mishina, both of Kawasaki; Mikio Sanada, Yokohama; Koichi Osumi, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,355

(22) Filed: Oct. 21, 1999

(30) Foreign Application Priority Data

Oct. 27, 1998 (JP) .......................................... 10-305990
Sep. 17, 1999 (JP) .......................................... 11-264171

(51) Int. Cl.[7] .......................... G01D 11/00; C09D 11/02
(52) U.S. Cl. ...................................... 347/100; 106/31.6
(58) Field of Search ................ 347/96, 100; 106/31.01, 106/31.13, 31.6

(56) References Cited

U.S. PATENT DOCUMENTS 5,900,899 A * 5/1999 Ichizawa et al. ............ 347/100
5,976,233 A    11/1999 Osumi et al. ............. 106/31.86
6,139,139 A * 10/2000 Stoffel et al. ................. 347/96
6,280,513 B1 * 8/2001 Osumi et al. .............. 106/31.6
2001/0020431 A1 * 9/2001 Osumi et al. .............. 106/31.6

FOREIGN PATENT DOCUMENTS

| EP | 0 631 872 A2 | 1/1995 |
|---|---|---|
| EP | 0 664 216 A2 | 7/1995 |
| EP | 0 688 836 A2 | 12/1995 |
| EP | 0 838 507 A1 | 4/1998 |
| EP | 0 861 732 A2 | 9/1998 |
| JP | 8-3498 | 1/1996 |
| JP | 10-183046 | 7/1998 |

* cited by examiner

Primary Examiner—Judy Nguyen
(74) Attorney, Agent, or Firm—Fitzpatrick, Cella, Harper & Scinto

(57) ABSTRACT

An ink set comprising a black ink and a color ink, suitable for an ink-jet recording apparatus comprising a common recovery system for a black ink-ejecting orifice and a color ink-ejecting orifice. The black ink comprises particles of self-dispersing carbon black having at least one anionic hydrophilic group at the surface thereof in an aqueous medium, and the pH of the color ink is higher than the pH of the black ink.

28 Claims, 5 Drawing Sheets

INK SET, INK-JET RECORDING PROCESS, INK-JET RECORDING APPARATUS, AND METHOD FOR ALLEVIATING FORMATION OF SOLID WITHIN COMMON RECOVERY-SYSTEM UNIT

BACKGROUND OF THE INVENTION

1. Field of the Invention

The present invention relates to an ink set, an ink-jet recording process, an ink-jet recording apparatus, and a method for alleviating the formation of solids within a common recovery-system unit.

2. Related Background Art

There have heretofore been reported black inks using self-dispersing carbon black for forming black-colored images excellent in optical density, print quality and fastness properties such as water fastness and light fastness on, in particular, plain paper in recording by an ink-jet system and also satisfying ejection stability and dispersion stability, ink sets by which no bleeding occurs at boundaries between an image printed with a black ink and an image printed with a color ink, and ink-jet recording processes and ink-jet recording apparatus or instruments using such an ink set.

For example, Japanese Patent Application Laid-Open No. 8-3498 describes self-dispersing carbon black capable of being stably dispersed without using any dispersing agent by introducing a water-soluble group in the surface of carbon black. Japanese Patent Application Laid-Open No. 10-183046 reports ink sets comprising a black ink using self-dispersing carbon black having a cationic group at the surface thereof and color inks each using an anionic dye.

In ink-jet recording apparatus such as ink-jet printers, ejection failure may occur in some cases due to mixing of bubbles, dust, recession of a meniscus in an ink ejection orifice at the tip of a nozzle and/or the like upon printing by a recording head, resulting in a failure to provide a clear print. In order to prevent such a situation, it is conducted to recover ejection of an ink from a nozzle to a normal state and to preliminarily discharge an ink so as to stabilize the ejection properties of the ink from the nozzle in advance. When such an operation for normally ejecting an ink from a nozzle, which is not conducted for printing as the original object, is performed in an ink-jet recording apparatus, it is general to conduct the operation of capping a region of each ink-ejection orifice with a cap and then sucking the ink present in the nozzle and the like through the cap by means of a sucking means such as a pump. The ink sucked is gathered as a waste ink in an ink reservoir through, for example, a tube for suction and recovery.

The ink reservoir is generally so constructed that a member having high water-absorbing capacity is contained in a cartridge for receiving a waste ink in order to prevent the ink from leaking from a feed opening of the ink reservoir (hereinafter referred to as "waste ink-absorbing member"). As the member having high water-absorbing capacity, which is usable as the waste ink-absorbing member, there may be used, for example, a high-density fibrous structure such as blotting paper or felt, a foam-molded material of polyurethane, PVA (polyvinyl alcohol) or the like, or the absorbing member comprising a water-absorbing polymer. The same shall apply to a member (hereinafter referred to as "in-cap absorbing member") contained in the cap for capping the ejection opening face of the recording head.

SUMMARY OF THE INVENTION

In the course of a variety of evaluation under such circumstances as described above, which has been conducted by charging a black ink comprising self-dispersing carbon black into an ink-jet printer, it has been found that the ink may come not to be gradually absorbed in the waste ink-absorbing member in some cases. In the very case where such an ink set comprising a black ink using self-dispersing carbon black having a cationic group at the surface thereof and color inks using an anionic dye as described in Japanese Patent Application Laid-Open No. 10-183046 is used, and an ink-jet recording apparatus has a cap for capping an ejection opining face of a recording head, a pump communicating with the interior of the cap and being capable of sucking inks contained in the cap, a waste ink-absorbing member, a passageway through which waste inks are operated, and the like for common use for the black ink and the color inks, solids such as aggregates and deposits have been formed in the interiors of the cap, pump, waste ink-absorbing member and the like (hereinafter referred to as "recovery-system unit") in some cases, resulting in a failure to reliably recover waste inks without staining the interior of the apparatus.

Although the common use of recovery-system unit for the black ink and the color inks is an extremely useful means for miniaturizing an ink-jet recording apparatus, the present inventors have been led to the conclusion that the adoption of this construction requires technical development for permitting the reliable recovery of the waste inks over a long period of time.

It is therefore an object of the present invention to provide an ink set which can prevent the formation of solids within a recovery-system unit of an ink-jet recording apparatus, and permits the reliable recovery of waste inks over a long period of time and the stable provision of high-quality prints.

Another object of the present invention is to provide an ink-jet recording process which permits the stable provision of high-quality prints.

A further object of the present invention is to provide a recording unit and an ink cartridge which can prevent the formation of solids within a recovery-system unit of an ink-jet recording apparatus, and permits the reliable recovery of waste inks over a long period of time and stable recording with high quality over a long period of time.

A still further object of the present invention is to provide an ink-jet recording apparatus which permits the stable provision of high-quality prints.

A yet still further object of the present invention is to provide an ink-jet recording apparatus which permits the stable formation of high-quality color images which scarcely undergo bleeding and staining with waste inks and the like.

A yet still further object of the present invention is to provide a method for alleviating the formation of aggregates and deposits within a recovery-system unit of an ink-jet recording apparatus.

In order to achieve the above objects, the present inventors have carried out various investigations and concluded that the formation of solids in the waste ink-absorbing member is considered to be attributable to the dispersion breaking of self-dispersing carbon black in a black ink comprising pigment particles of the self-dispersing carbon black. More specifically, for example, a hydrophilic group is being bonded to the surface of self-dispersing carbon black, and a counter ion (for example, an ammonium ion) to the hydrophilic group gradually volatilizes during the retention of the ink within the recovery-system unit. As a result, the dispersibility of the self-dispersing carbon black in an aqueous medium is deteriorated, and so the ink is changed to a state liable to form solids, and the solids formed gradually adhere to the recovery-system unit including the waste ink-absorbing member.

On the other hand, the present inventors have carried out an investigation as to the relationship between viscosity and pH in a black ink comprising pigment particles of anionically charged self-dispersing carbon black. As a result, it has been found that the ink exhibits such relationship as shown in (a) in FIG. 7. More specifically, the viscosity of the black ink rapidly increases or lowers as the pH thereof becomes lower or higher. Accordingly, when the pH of the black ink is lowered within a recovery system by some reason, and its viscosity is rapidly increased, only a medium in the ink is absorbed in the waste ink-absorbing member, and so the self-dispersing carbon black remains on the surface of the absorbing member. It is thus considered that the carbon black gradually deposits, so that the absorption of waste inks is prevented. The present inventors have already found that the viscosity of the black ink comprising the self-dispersing carbon black having an anionic hydrophilic group as the hydrophilic group on the surface thereof is lowered in an alkaline region and increased by dispersion breaking in an acid region.

Thus, the present inventors have inferred that to prevent the dispersion breaking of the black ink is useful for preventing the adhesion of solids to the recovery system and found that when the pH of the black ink is adjusted so as not to form solids within the recovery system, the adhesion of solids formed is extremely effectively prevented. The present invention has been led to completion on the basis of these findings.

The above objects can be achieved by the present invention described below.

According to a first aspect of the present invention, there is thus provided an ink set comprising a black ink and a color ink and being suitable for an ink-jet recording apparatus comprising a common recovering means for a black ink-ejecting means and a color ink-ejecting means, wherein the black ink comprises particles of self-dispersing carbon black having at least one anionic hydrophilic group at the surface thereof in an aqueous medium, and the pH of the color inks is higher than the pH of the black ink.

According to another aspect of the present invention, there is also provided an ink-jet recording process, comprising the step of: (i) applying energy to at least one of a black ink and a color ink; (ii) ejecting the ink to which the energy is applied and attaching the ejected ink to a recording medium, the steps (i) and (ii) being conducted with an ink-jet recording apparatus provided with a common recovery means for a black ink-ejecting means and a color ink-ejecting means, wherein the black ink comprises particles of self-dispersing carbon black having at least one anionic hydrophilic group at the surface thereof in an aqueous medium and having a prescribed pH, and the color ink has a pH higher than the pH of the black ink.

According to another aspect of the present invention, there is further provided a recording unit comprising at least two ink-containing portions containing a black ink and a color ink respectively, and an ink-jet head for ejecting the black ink and the color ink respectively, the recording unit being for an ink-jet recording apparatus provided with a common recovery means for a black ink-ejecting orifice and a color ink-ejecting orifice of the ink-jet head, wherein the black ink comprises particles of self-dispersing carbon black having at least one anionic hydrophilic group at the surface thereof in an aqueous medium and having a prescribed pH, and the color ink has a pH higher than the pH of the black ink.

According to another aspect of the present invention, there is still further provided an ink cartridge suitable for use in an ink-jet recording apparatus provided with an ink-jet head ejecting a black ink and a color ink, and a common recovering means for a black ink-ejecting orifice of the ink-jet head and a color ink-ejecting orifice of the ink-jet head comprising at least two ink-containing portions containing the black ink and the color ink, respectively, wherein the black ink comprises particles of self-dispersing carbon black having at least one anionic hydrophilic group at the surface thereof in an aqueous medium and has a prescribed pH, and the color ink has a pH higher than the pH of the black ink.

According to another aspect of the present invention, there is yet still further provided an ink-jet recording apparatus comprising a recording unit which has at least two ink-containing portions and a head portion for ejecting the inks fed from the ink-containing portions in the form of ink droplets by the action of thermal energy, and further a cap for capping ejection opening faces of the head portion, a pump communicating with the interior of the cap and being capable of sucking an ink contained in the cap, and a waste ink-absorbing member for absorbing and preserving the waste ink discharged from the pump, wherein the ink-containing portions respectively contains at least two inks making up the ink set described above.

According to another aspect of the present invention, there is yet still further provided an ink-jet recording apparatus comprising a recording unit which has an ink cartridge equipped with at least two ink-containing portions, and a head portion for ejecting the inks fed from the ink-containing portions in the form of ink droplets by the action of thermal energy, and further a cap for capping ejection opening faces of the recording head, a pump communicating with the interior of the cap and being capable of sucking an ink contained in the cap, and a waste ink-absorbing member for absorbing and preserving the waste ink discharged from the pump, wherein the ink-containing portions separately contains at least two inks making up the ink set described above.

According to another aspect of the present invention, there is yet still further provided an ink-jet recording apparatus comprising a recording unit which has at least two ink-containing portions respectively containing at least two inks of different colors and a head portion for ejecting the inks fed from the ink-containing portions, a cap for capping together ejection opening faces for said at least two inks provided in the head portion, a pump for sucking the inks in the head portion through the cap, and an ink-absorbing member for preserving said at least two inks sucked by the pump, wherein said two inks of different colors are a black ink comprising self-dispersing carbon black having at least one anionic hydrophilic group at the surface thereof in an aqueous medium, and a color ink having a pH higher than the pH of the black ink.

According to further aspect of the present invention, there is yet still further provided an ink-jet recording apparatus comprising a plurality of ink cartridges separately containing at least two inks of different colors, a head portion, in which the ink cartridges are detachably installed and from which the inks contained in ink-containing portions of the respective ink cartridges are ejected, a cap for capping together ejection opening faces for said at least two inks provided in the head portion, a pump for sucking the inks in the head portion through the cap, and an ink-absorbing member for preserving said at least two inks sucked by the pump, wherein said two inks of different colors are a black ink comprising self-dispersing carbon black having at least one anionic hydrophilic group at the surface thereof in an aqueous medium, and a color ink having a pH higher than the pH of the black ink.

According to still further aspect of the present invention, there is yet still further provided a method for alleviating the formation of solids within a common recovery-system unit of an ink-jet recording apparatus which is provided with a black ink comprising self-dispersing carbon black and a color ink and has a recovery-system unit for common use for the black ink and the color ink, which comprises using a color ink having a pH higher than the pH of the black ink as the color ink.

According to the above-described embodiments of the present invention, even when an ink-jet recording apparatus has a recovery system for common use for a plurality of inks, the formation of solids within the recovery system can be prevented. As a result, a black-colored print having excellent water fastness can be provided. There is also brought about an effect that waste inks produced by preliminary ejection of inks and a recovery operation such as recovery by suction or pressurization, which are necessary for printing using an in-jet recording apparatus, can be reliably recovered stably over a long period of time without staining the interior of the apparatus. Further, an effect that an ink-jet recording apparatus can be miniaturized can be brought about by the common use of a recovery system for a black ink and color inks.

DESCRIPTION OF THE PREFERRED EMBODIMENTS

Figure 1:
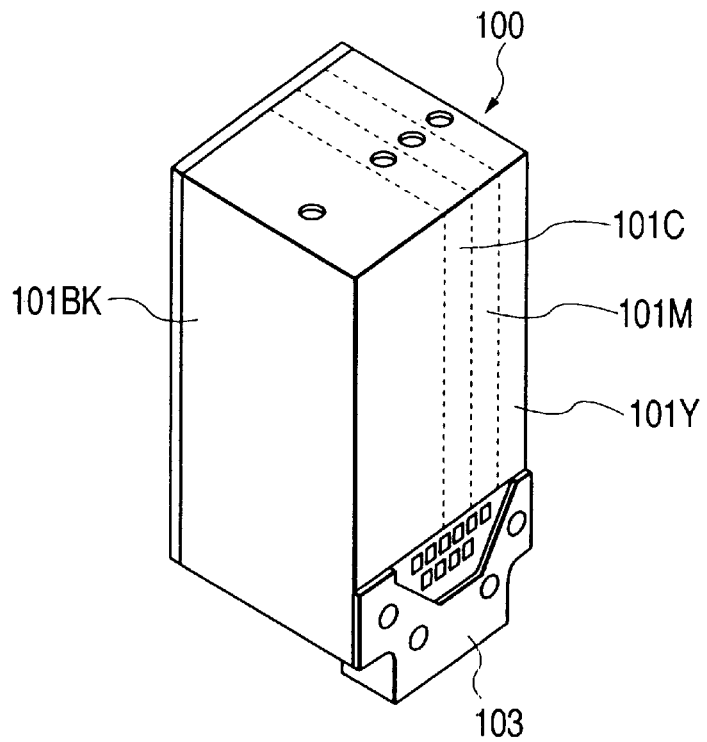
FIG. 1 is a schematic perspective view of a recording unit according to an embodiment of the present invention.

The present invention will hereinafter be described in more detail by the preferred embodiments of the invention.

A water-based black pigment ink, which is a black ink according to the present invention, is a water-based ink comprising specific carbon black and containing no dispersing agent for dispersing a pigment. The individual components of the black pigment ink and color inks according to the present invention will hereinafter be described in order.

In the water-based pigment ink which is a black ink according to the present invention, first of all, particles of self-dispersing carbon black to the surface of which at least one hydrophilic group is bonded directly or preferably through an atomic group are used as a coloring material. As a result, there is no need to use a dispersing agent for dispersing carbon black like the conventional inks. Examples of anionically charged self-dispersing carbon black used in the present invention include those in which the hydrophilic group bonded to the surface thereof is —COOM, —SO$_3$M, —PO$_3$HM or —PO$_3$M$_2$, wherein M is hydrogen, alkali metal, ammonium or organic ammonium. In the present invention, it is preferred that anionically charged self-dispersing carbon black with —COOM or —SO$_3$M among these groups bonded to the surface thereof be used. Carbon black charged with —COOM is particularly preferred. "M" in the above-described hydrophilic groups is preferably ammonium.

When the ammonium is used as a counter ion, the time required to develop the water fastness of the black ink in a recorded portion can be shortened. The reason why the time required to develop the water fastness of the black pigment ink can be shortened as described above is considered to be attributable to the fact that ammonia volatilizes from the surfaces of the carbon black particles in the recorded portion of the resultant print to form a free acid.

The particles of anionically charged self-dispersing carbon black can be prepared, for example, by subjecting carbon black to an oxidation treatment with sodium hypochlorite to obtain self-dispersing carbon black to the surface of which a —COONa group has been bonded, and substituting ammonium for Na of the thus-obtained self-dispersing carbon black by an ion-exchange process, thereby bonding a —COONH$_4$ group to the surfaces of carbon black particles. It goes without saying that the present invention is not limited to this process, and any conventionally known process may be used.

In the present invention, it is preferred that the hydrophilic group be bonded to polymer chains making up the carbon black particles through an atomic group. Examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of the atomic group and the hydrophilic group include —C$_2$H$_4$COOM, —PhSO$_3$M and —PhCOOM, wherein Ph is a phenylene group. It goes without saying that the present invention is not limited to these combinations.

The self-dispersing carbon black particles used in the water-based black ink according to the present invention are anionically charged by the hydrophilic group bonded to the surface thereof and have excellent dispersibility in water by virtue of repulsion of the ion thereof and also improved hydrophilicity by virtue of the hydrophilic group.

In the present invention, the self-dispersing carbon black is not limited to one kind, and two or more kinds of such carbon black may be used in combination to control the color tone of the ink. The amount of the self-dispersing carbon black to be added in the pigment ink according to the present invention is preferably within a range of from 0.1 to 15% by weight, more preferably from 1 to 10% by weight based on the total weight of the ink. In addition to the self-dispersing carbon black, a dye may be used to control the color tone of the ink.

A salt may be added to the black ink. By the coexistence of the salt with the self-dispersing carbon black in the black ink, the ink can be provided as an ink capable of stably forming high-quality images without greatly varying the quality of images with the kind of a recording medium used.

The detailed mechanism that the ink according to this embodiment exhibits such a property as described above has not been clearly known up to the present. However, with respect to the Ka value determined by the Bristow method known as a measure indicating the penetrability of an ink into recording media, the present inventors have found that the ink according to this embodiment exhibits a great Ka value compared with an ink having the same composition except that no salt is added. The increase in Ka value indicates that the penetrability of the ink into recording media has been improved. It has heretofore been the common sense of those skilled in the art that the improvement in the penetrability of an ink means the lowering of optical density. More specifically, the those skilled in the art have heretofore recognized that a coloring material also penetrates into a recording material together with the penetration of the ink, and consequently the optical density of an image formed is lowered. Synthetically judging from the various findings as to the ink according to this embodiment, the salt in the ink according to this embodiment is considered to cause a specific action that separation (solid-liquid separation) between a solvent and solids in the ink after the application to a recording medium is extremely rapidly caused. More specifically, if the solid-liquid separation upon the application of the ink to the recording medium is slowed, it is expected that the ink isotropically diffuses in the recording medium when the ink has a great Ka value, or the recording medium has high permeability, so that the sharpness (character quality) of characters is impaired, and moreover the optical density is also lowered due to the penetration of the coloring material up to the interior of the recording medium. In the ink according to the present invention, however, such a phenomenon is not observed. Therefore, it is considered that the solid-liquid separation rapidly occurs, and consequently high-quality images are provided in spite of the increase of Ka value of the ink. The reason why deterioration of character quality and lowering of optical density are hard to occur in the ink according to this embodiment even when the recording medium is paper having comparatively high permeability is considered to be the same as described above. The content of the salt is preferably within a range of from 0.05 to 10% by weight, particularly from 0.1 to 5% by weight based on the total weight of the ink.

The salt to be used is preferably at least one selected from the group consisting of $(M1)_2SO_4$, $CH_3COO(M1)$, $Ph—COO(M1)$, $(M1)NO_3$, $(M1)Cl$, $(M1)Br$, $(M1)I$, $(M1)_2SO_3$ and $(M1)_2CO_3$, wherein M1 is alkali metal, ammonium or organic ammonium, and Ph is a phenyl group. Specific examples of the alkali metal include Li, Na, K, Rb and Cs, and specific examples of the organic ammonium include methylammonium, dimethylammonium, trimethylammonium, ethylammonium, diethylammonium, triethylammonium, methanolammonium, dimethanolamonium, trimethanolammonium, ethanolammonium, diethanolammonium and triethanolammonium.

Figure 7:
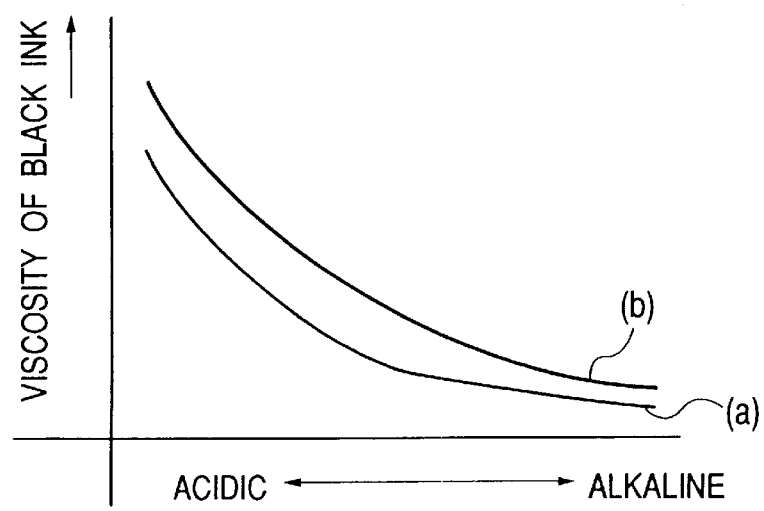
FIG. 7 diagrammatically illustrates the relationship between viscosity and pH in a black ink comprising pigment particles of anionically charged self-dispersing carbon black.

In an embodiment that the black ink with such a salt added thereto is used, the effect brought about by making the pH of the color ink higher than that of the black ink and having a recovery-system unit for common use for the black ink and the color ink can be more effectively utilized. More specifically, when the pH of the black ink with the salt added thereto is shifted on an acid side in a state that the ink is retained in the recovery-system unit, its viscosity tends to more increase than a black ink containing no salt (see (b) in FIG. 7). Namely, it can be said that solids are easy to be formed in the recovery-system unit. According to the present invention, however, the lowering of the pH within the recovery-system unit can be effectively prevented. As a result, ink-jet recording can be performed with far excellent image quality. Other specific examples of the ink according to this embodiment include inks comprising self-dispersing carbon black to the surface of which at least one selected from among —COOM, —$SO_3$M and —$PO_3$HM is bonded directly or through another atomic group, and a salt in which M1 is the same as M. These inks are more improved in stability, and so this embodiment is one of particularly preferred embodiments. For example, when M is ammonium ($NH_4$), and so an ammonium salt, for example, ammonium benzoate is added as the salt, the water fastness and the like of an image obtained by ink-jet recording using this ink can be more improved. In addition, when such an ink set is used to form a color image, the occurrence of bleeding at boundaries between an image formed with the carbon black-containing ink and an image formed with an ink containing another coloring material can be effectively prevented. The reason why such effects as described above are brought about by this embodiment is not clearly known. However, it is considered that the rapidity of solid-liquid separation at the surface of a recording medium takes part in the effects.

As coloring materials used for color inks making up the ink set according to the present invention, may be used any dyes and pigments routinely used in color inks. However, it is preferred to use dyes from the viewpoint of coloring ability. As the dyes, almost all of, for example, acid dyes, direct dyes, etc. may be used. No particular limitation is imposed on the content of the coloring material in each color ink. However, it is preferably within a range of from 0.1 to 20% by weight based on the total weight of the ink.

As anionic dyes used as a component of the color inks making up the ink set according to the present invention, most of both dyes already known and newly synthesized may be used so far as they have proper color tone and density. Some of them may also by used in combination. As specific examples of the anionic dyes, may be mentioned the following dyes:

C.I. Direct Yellow 8, 11, 12, 27, 28, 33, 39, 44, 50, 58, 85, 86, 87, 88, 89, 98, 100, 110, 132 and 142;

C.I. Direct Red 2, 4, 9, 11, 20, 23, 24, 31, 39, 46, 62, 75, 79, 80, 83, 89, 95, 197, 201, 218, 220, 224, 225, 226, 227, 228 and 229;

C.I. Direct Blue 1, 15, 22, 25, 41, 76, 77, 80, 86, 90, 98, 106, 108, 120, 158, 163, 168, 199 and 226;

C.I. Direct Black 17, 19, 22, 31, 32, 51, 62, 71, 74, 112, 113, 154, 168 and 195;

C.I. Acid Yellow 1, 3, 7, 11, 17, 23, 25, 29, 36, 38, 40, 42, 44, 76, 98 and 99;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C.I. Acid Blue 1, 7, 9, 15, 22, 23, 25, 29, 40, 43, 59, 62, 74, 78, 80, 90, 100, 102, 104, 117, 127, 138, 158 and 161;

C.I. Acid Black 2, 48, 51, 52, 110, 115, 156;

C.I. Reactive Yellow 2, 3, 17, 25, 37 and 42;

C.I. Reactive Red 7, 12, 15, 17, 20, 23, 24, 31, 42, 45, 46 and 59;

C.I. Reactive Blue 4, 5, 7, 13, 14, 15, 18, 19, 21, 26, 27, 29, 32, 38, 40, 44 and 100;

C.I. Food Yellow 3;

C.I. Food Red 87, 92 and 94; and

C.I. Food Black 1 and 2.
Further, dyes having respective structural formulae mentioned below may also be preferably used.
Exemplified Compound No. 1
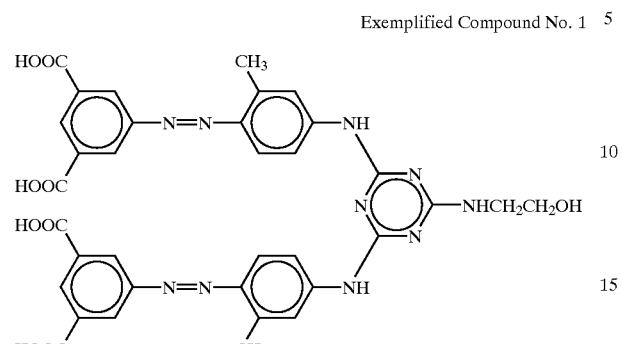
Exemplified Compound No. 2
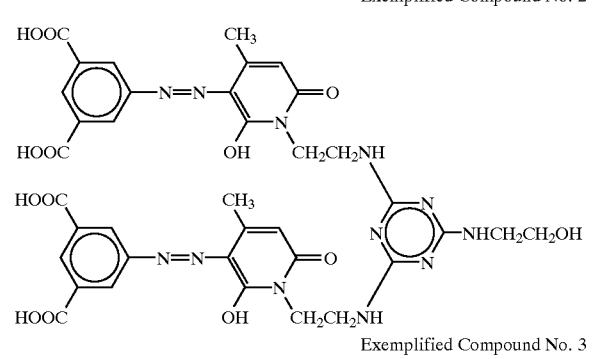
Exemplified Compound No. 3
Exemplified Compound No. 4
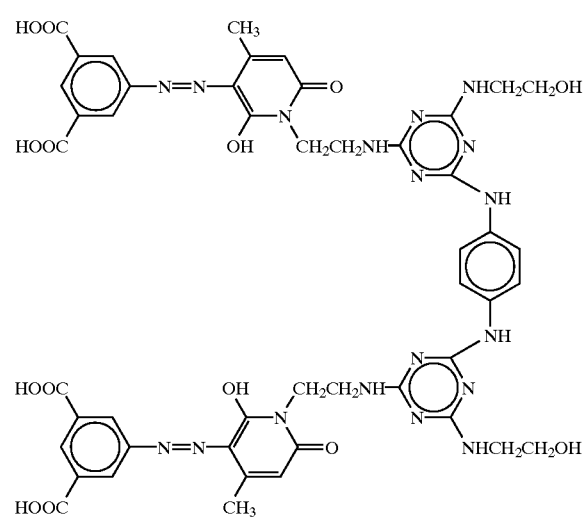
Exemplified Compound No. 5
Exemplified Compound No. 6
Exemplified Compound No. 7
Exemplified Compound No. 8
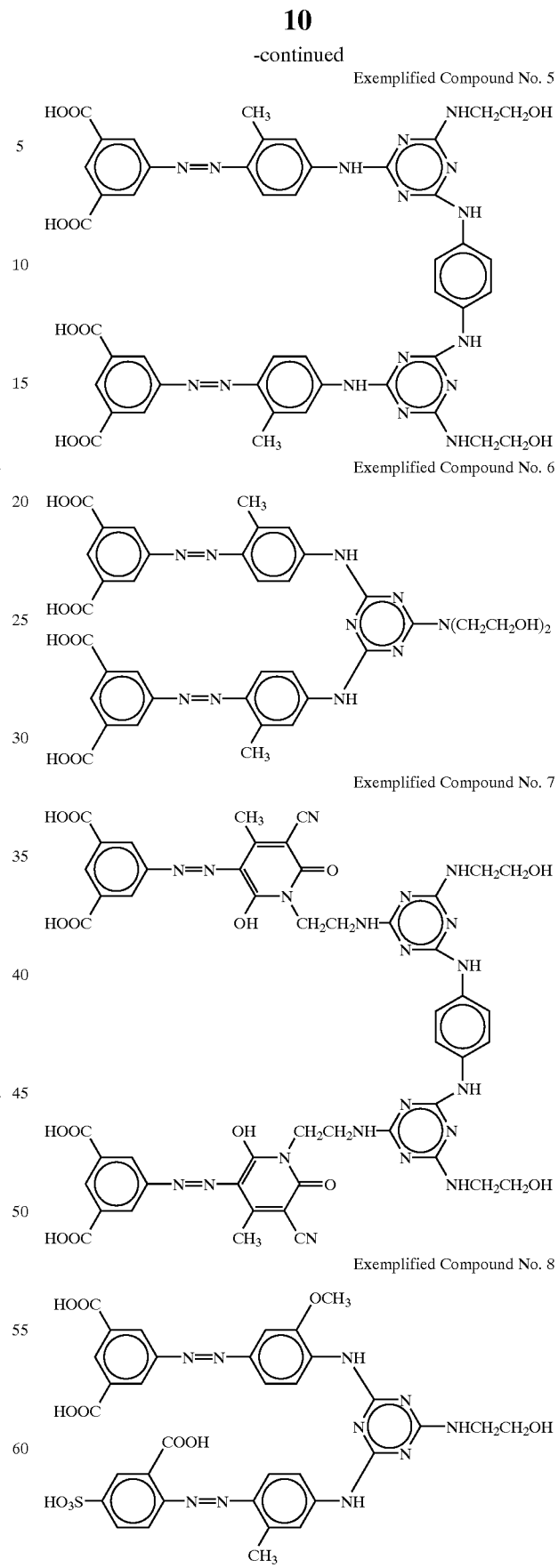

Exemplified Compound No. 9
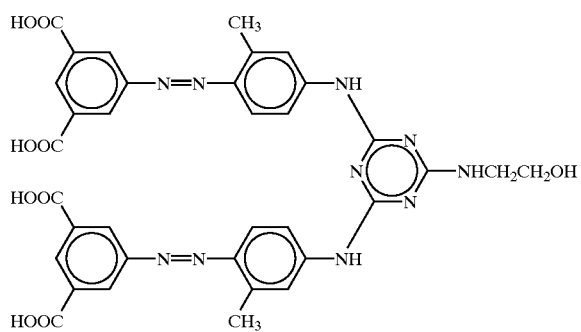
Exemplified Compound No. 10
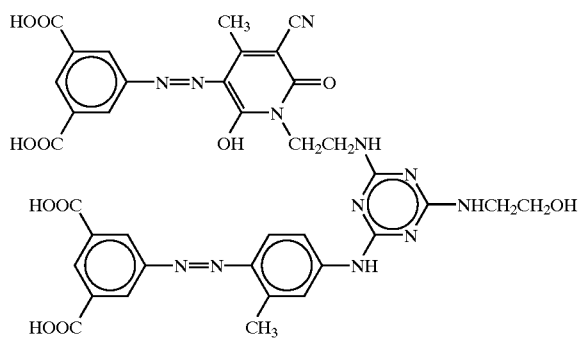
Exemplified Compound No.11
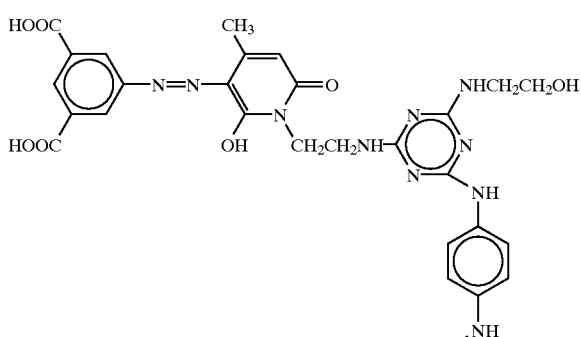
Exemplified Compound No. 12
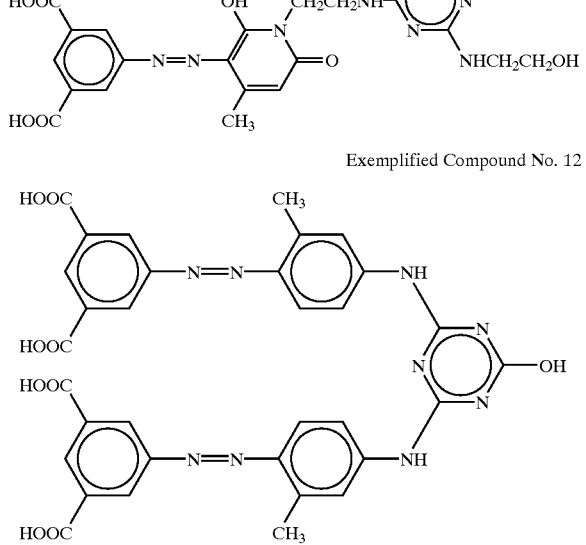
Exemplified Compound No. 13
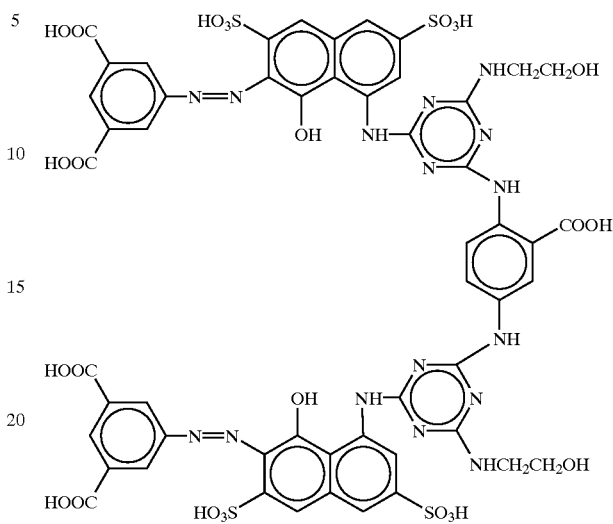
Exemplified Compound No. 14
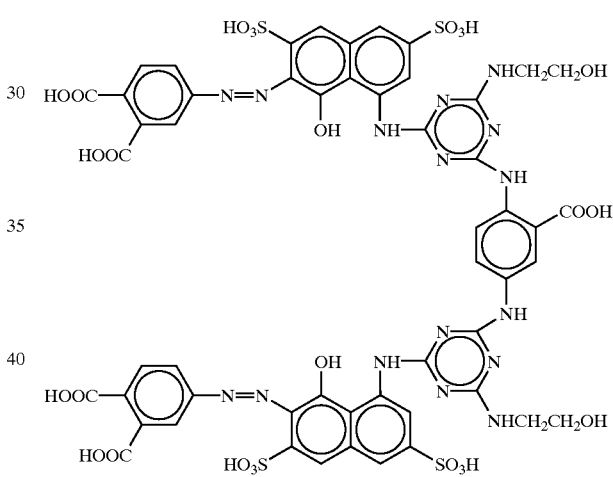
Exemplified Compound No. 15
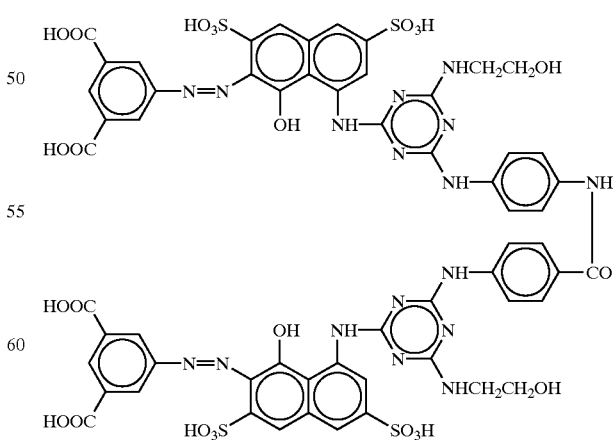

Exemplified Compound No. 16
Exemplified Compound No. 18
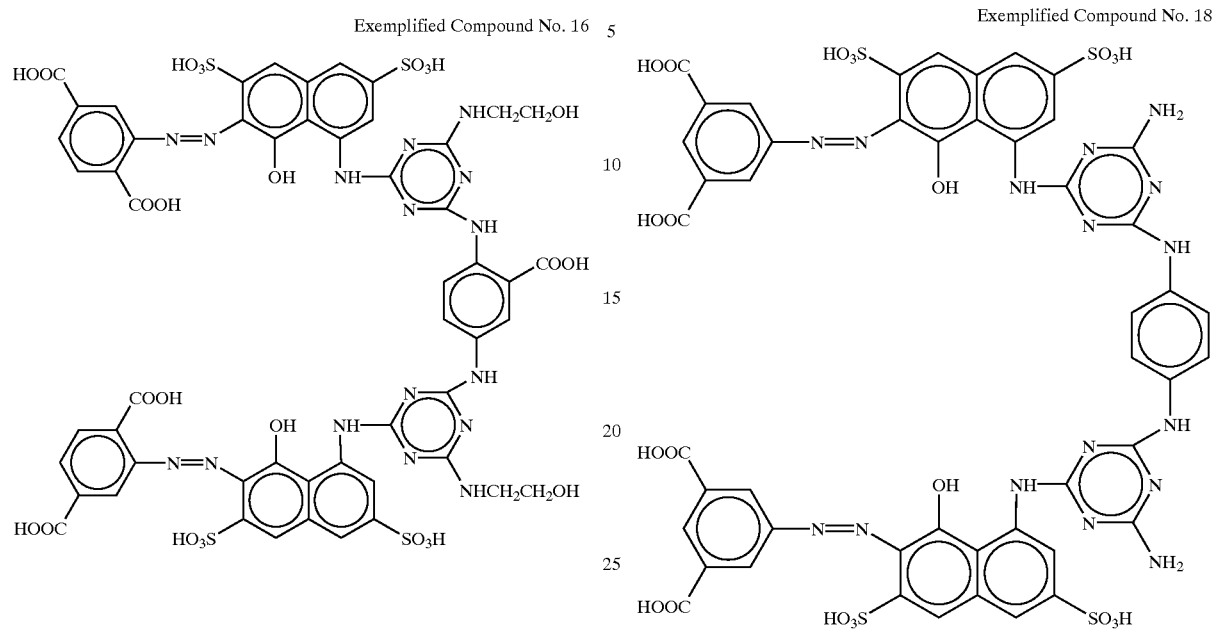
Exemplified Compound No. 17
Exemplified Compound No. 19
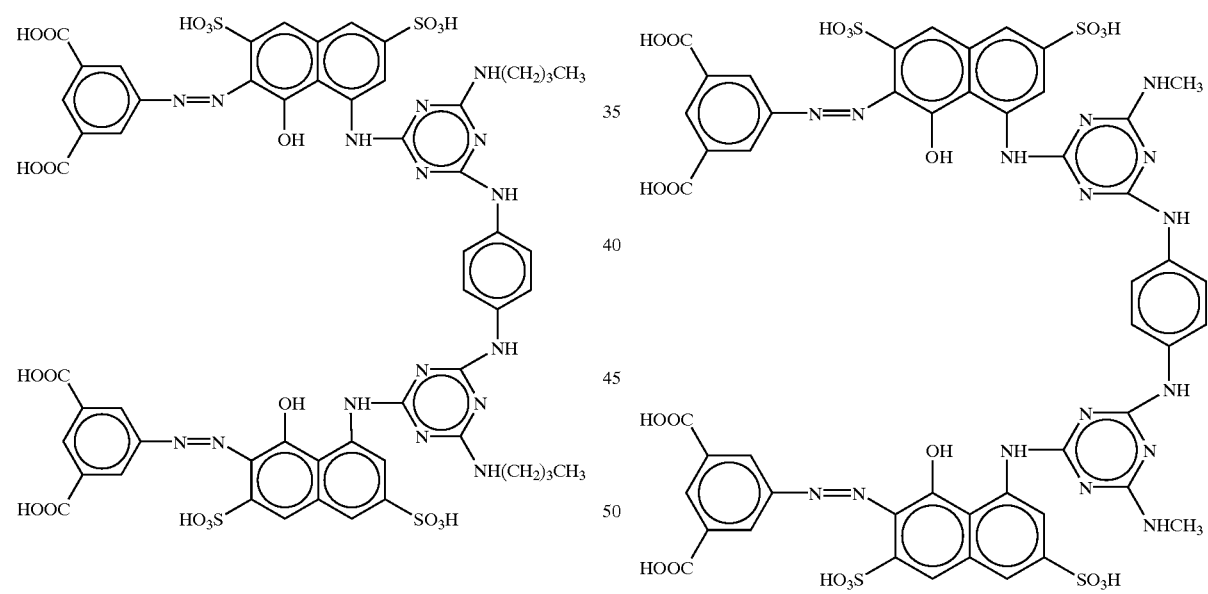

Exemplified Compound No. 20

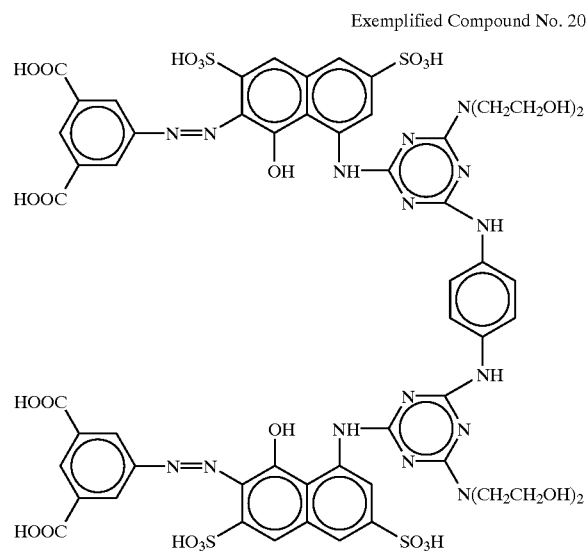

Exemplified Compound No. 21

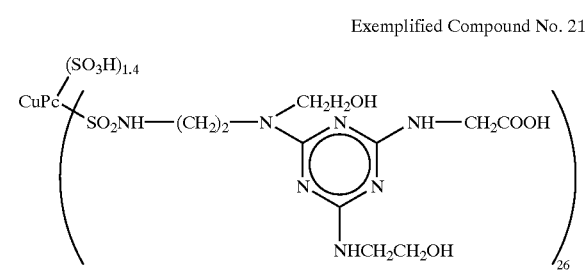

Exemplified Compound No. 22

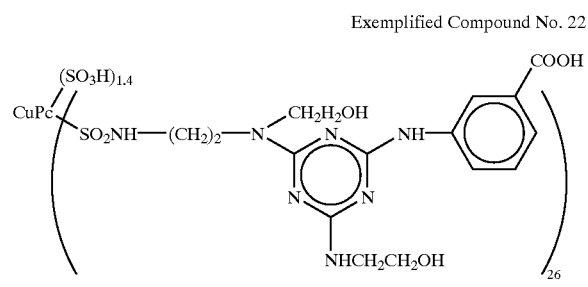

Exemplified Compound No. 23

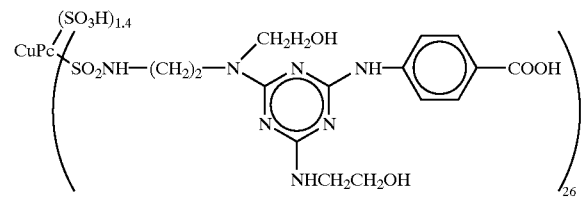

Exemplified Compound No. 24

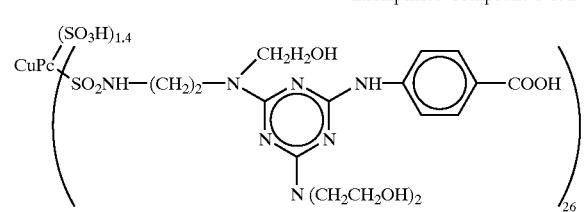

Exemplified Compound No. 25

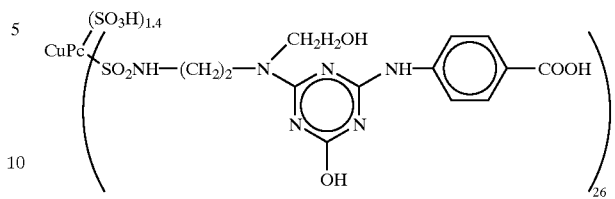

Exemplified Compound No. 26

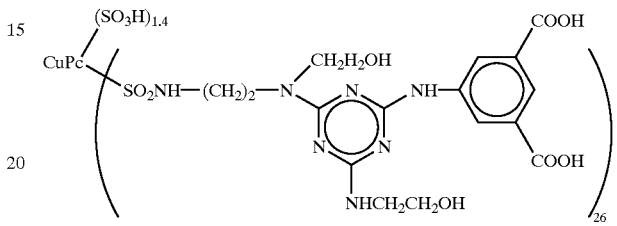

Exemplified Compound No. 27

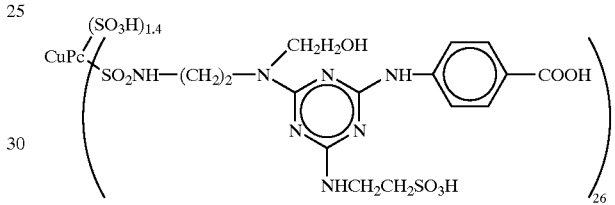

By the way, the pH of the water-based black pigment ink described above is generally within a range of from 7 to 8 so far as it is not particularly adjusted. As described above, the pH of the black ink may be shifted to an acid range in some cases when it is left to stand in the recovery-system unit, for example, a waste ink-absorbing member, for a long period of time, and the viscosity thereof may be increased correspondingly. It is considered that when the viscosity of the black ink within the recovery-system unit is too increased at this time, suction for recovery may be adversely affected. Even in such a case, the lowering of the pH of waste inks within the recovery-system unit can be prevented by making the pH of color inks higher than the pH of the black ink and so constructing the apparatus that the black ink and the color inks may be mixed in the recovery-system unit. The pH of the color inks is desirably higher than the pH of the black ink by at least 1, preferably at least 2. In this case, the pH of a color ink adjacent to an ejection orifice for the black ink is preferably higher. For example, when an alkaline metal salt is contained in the color inks, an alkaline metal ion in each color ink becomes a counter ion to the hydrophilic group on the surface of the carbon black, so that dispersion breaking and insolubilization of the waste inks within the recovery-system unit can be prevented. In this embodiment, also, the pH of the color inks is desirably made higher than the pH of the black ink by at least 1, preferably at least 2.

Examples of a hydroxide contained in the color inks according to the present invention include sodium hydroxide, lithium hydroxide, potassium hydroxide, ammonium hydroxide, magnesium hydroxide, calcium hydroxide, calcium hydroxide and barium hydroxide. However, the hydroxides are not limited thereto.

No particular limitation is imposed on the content of the hydroxide. However, it is preferably within a range of from 0.01 to 10% by weight, preferably from 0.01 to 5% by weight based on the total weight of the ink.

Examples of the alkaline metal salt contained in the color inks according to the present invention include lithium acetate, sodium acetate, potassium acetate, beryllium acetate, magnesium acetate, calcium acetate, lithium nitrate, sodium nitrate, potassium nitrate, beryllium nitrate, magnesium nitrate, calcium nitrate, lithium phosphate, sodium phosphate, potassium phosphate, beryllium phosphate, magnesium phosphate, calcium phosphate, lithium carbonate, sodium carbonate, potassium carbonate, beryllium carbonate, magnesium carbonate, calcium carbonate, lithium oxalate, sodium oxalate, potassium oxalate, beryllium oxalate, magnesium oxalate and calcium oxalate. However, the alkaline metal salts are not limited thereto.

No particular limitation is imposed on the content of the alkaline metal salt. However, it is preferably within a range of from 0.01 to 10% by weight, preferably from 0.01 to 5% by weight based on the total weight of the ink.

The aqueous medium contained in the water-based pigment ink as a black ink and color inks according to the present invention is composed of water alone or a mixed solvent of water and a water-soluble organic solvent. As the water-soluble organic solvent, those having an effect of preventing the drying of the inks are particularly preferred. With respect to the water, it is desirable to use deionized water instead of tap water containing various ions.

Specific examples of the water-soluble organic solvents used in the present invention include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N- methyl-2-pyrrolidone; 2-pyrrolidone; and 1,3-dimethyl-2-imidazolidinone. Such water-soluble organic solvents as mentioned above may be used either singly or in any combination thereof.

No particular limitation is imposed on the content of such water-soluble organic solvents as mentioned above contained in the water-based black pigment ink and color inks according to the present invention. However, it is preferably within a range of from 3 to 50% by weight based on the total weight of each ink. On the other hand, the content of water contained in the inks is preferably within a range of from 50 to 95% by weight based on the total weight of each ink.

The water-based black pigment ink and color inks according to the present invention may contain, in addition to the above-described components, a surfactant, an antifoaming agent, an antiseptic, a mildewproofing agent and the like, as needed, to provide them as inks having desired physical properties. Further, a commercially-available water-soluble dye or the like may be added.

As described above, the ink set according to the present invention is particularly effective upon use in ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to the present invention are particularly suitable for use in these recording methods.

(Ink-jet Recording Apparatus)

Figure 2:
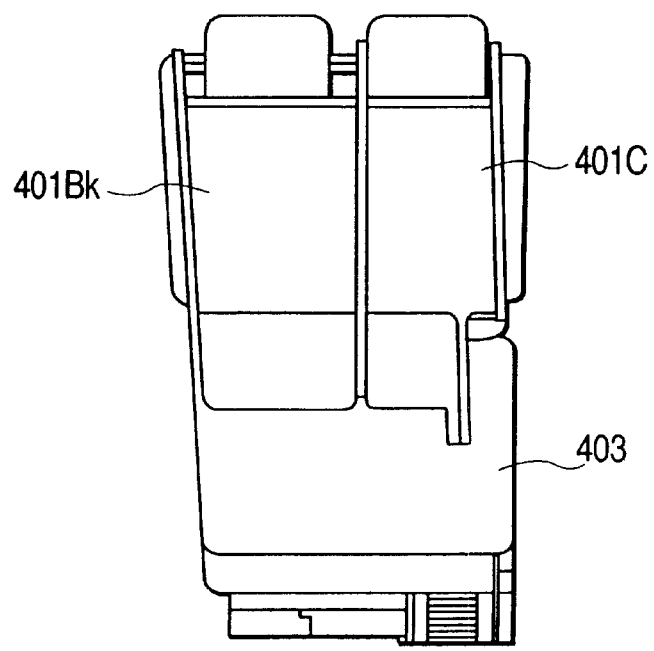
FIG. 2 is a schematic plan view illustrating a state that ink cartridges separately containing a black ink and a color ink have been installed in a recording head.
Figure 4:
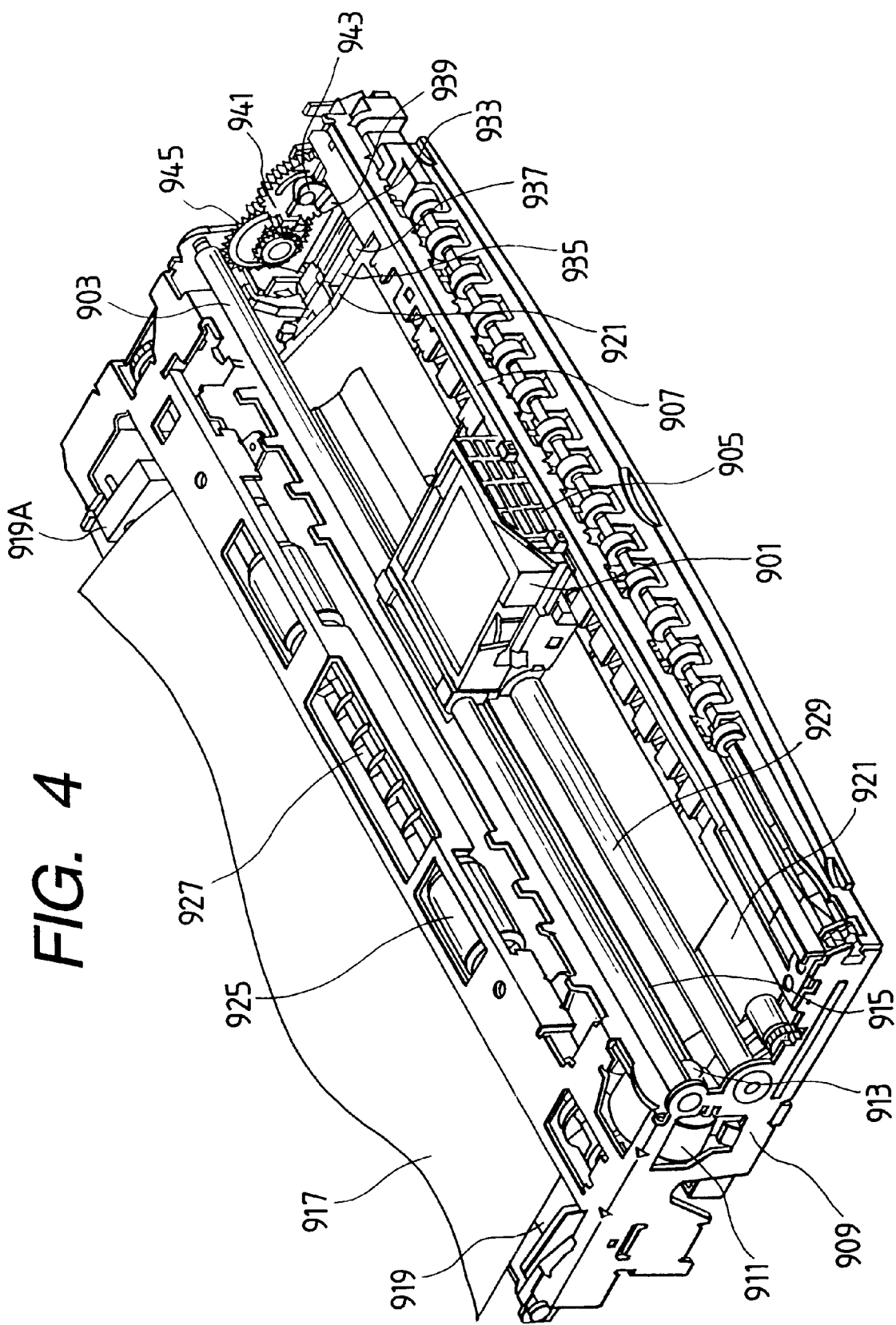
FIG. 4 is a schematic perspective view of an ink-jet printer.
Figure 5:
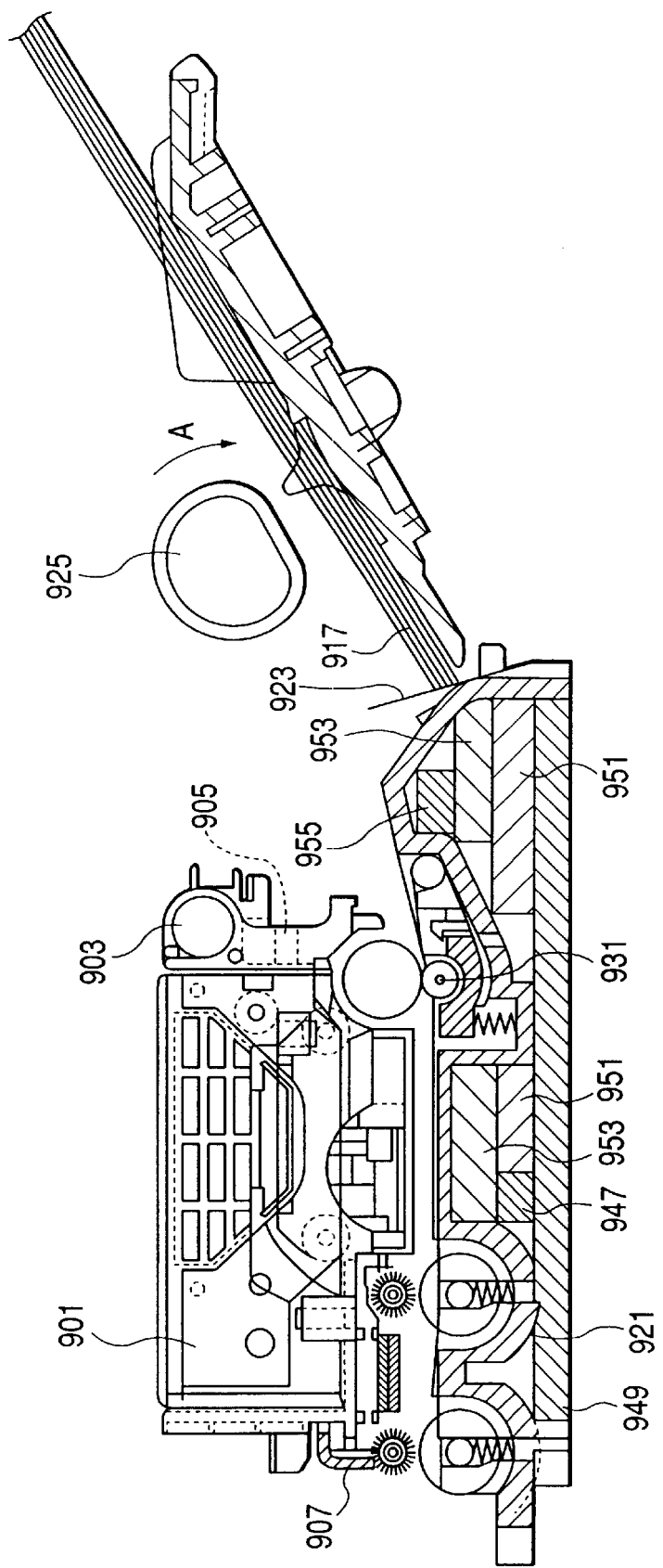
FIG. 5 is a schematic cross-sectional view of the ink-jet printer illustrated in FIG. 4.
Figure 6:
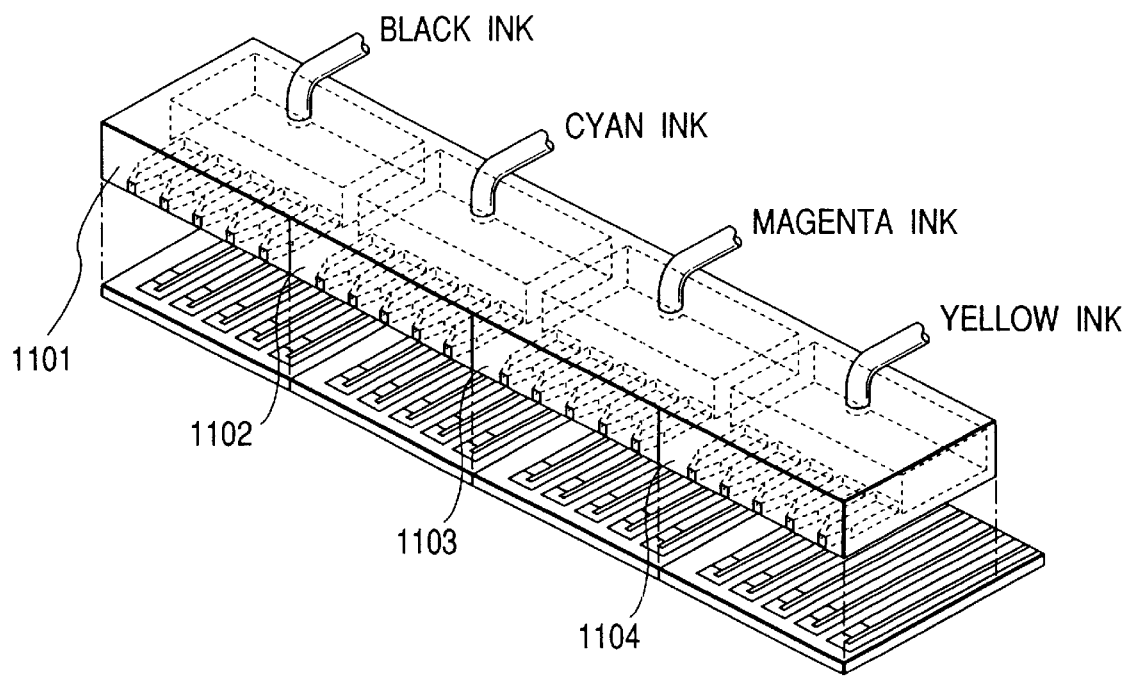
FIG. 6 is a enlarged view illustrating an orifice part of a recording head portion according to an embodiment in the ink-jet printer illustrated in FIG. 4.

FIGS. 4 and 5 schematically illustrate an ink-jet recording apparatus according to an embodiment of the present invention. In this ink-jet recording apparatus, an ink-jet recording head 901 is mounted on a carriage 905 slidably interlocked with a guide shaft 903 and a guide rail 907. The carriage 905 is moved by fixing a part of a timing belt 915 wound around a pulley 913 driven by a carriage motor 911 held on a chassis 909 to the carriage 905 (not illustrated). The carriage is reciprocatingly moved by changing the direction of rotation of the carriage motor 911. The guide shaft 903 and guide rail 907 are held by the chassis 909. Examples of the recording head 901 include a form that ink-containing portions (101Bk, 101C, 101M and 101Y), in which inks of different colors are respectively contained, are integrally formed with a recording head 103 to construct a recording unit designated as 100 in FIG. 1, and a form that ink cartridges (401Bk and 401C), in which inks of different colors are respectively contained, are detachably installed in a recording head 403 as illustrated in FIG. 2. In such a recording head, orifices are arranged in rows as illustrated in FIG. 6, and flow paths of the inks of different colors are separately constructed in such a manner that the inks can be individually ejected from the respective orifices (1101 to 1104). Each of the inks is ejected from a plurality of ejection openings arranged in rows toward a recording paper sheet 917 as a recording medium in response to signals from a control circuit.

The recording paper sheets 917 are set on the upper surface of a platen 919 and stacked with the right ends of the recording paper sheets 917 aligned with a left side wall of a release lever 919A integrally formed with the platen 919 at a right end thereof. As illustrated in FIG. 5, the leading edges of the recording paper sheets 917 strike the lower portion of an elastic member 923 the lower part of which has been fixed to a base 921 and held thereby. Accordingly, a paper stack part is formed by the base 921 and the elastic member 923 the lower part of which has been fixed to the base 921. When a paper feed motor (not illustrated) is rotated by a paper-feed command from a controller (not illustrated), the rotation is transmitted by a gear train (not illustrated) to pick-up rubbers 925, so that the pick-up rubbers 925 are rotated in a direction of an arrow A to release a cam part, and the platen 919 is lifted by a platen spring (not illustrated), whereby the recording paper sheets 917 stacked on the platen 919 are brought into contact under pressure with the pick-up rubbers 925 provided around a feed roller shaft 927. The pick-up rubbers 925 having a high coefficient of friction are fitted on the feed roller shaft 927 in such a manner that the outer diameter thereof becomes greater than the maximum outer diameter of the feed roller shaft 927. Separation pads, which are frictional members for preventing slip of the recording paper sheet 917, are fixed on the platen 919 at positions opposite to the pick-up rubbers 925. Accordingly, when the feed roller shaft 927 is further rotated on its axis, the recording paper sheets 917 pressed out forward by the friction force of the pick-up rubbers 925 deflect the elastic member 923 the lower part of which has been fixed to the base 921. The recording paper sheet located at the upper-most position is separated from the others by the action of resisting force of the elastic member 923 and sent out. Therefore, the elastic member 923 is held as a separating means by the base 921. The recording paper sheet 917 separated and fed is fed to below the carriage 905, i.e. above the base 921 while being held between a feed roller 929 supported by the chassis 909 at both ends thereof and a pinch roller 931 provided at the base 921. This region is generally called a platen part, and a rib for guiding the recording paper sheet 917, a rib for supporting the recording paper sheet 917 from the lower side when the recording paper sheet is bent, etc. are provided. The recording paper sheet 917 strikes the feed roller 929 and pinch roller 931, which are reversely rotated, to align the leading edge thereof, and then fed to below the carriage 905 by rotating the feed roller 929 forward. In this state, the carriage 905 is scanned in a direction perpendicular to the feeding direction of the recording paper sheet 917 by driving the carriage motor 911, and inks are ejected from the recording head 901 mounted on the carriage 905 according to a recording command, thereby practicing recording on the recording paper sheet 917.

(Capping Mechanism/pumping Mechanism)

A cap member 933 for capping the whole surface of the recording head 901 is formed by, for example, an elastic material capable of tightly closing the recording head 901, for example, a proper material having elasticity, such as chlorinated butyl rubber. The cap member 933 is integrally held by a cap holder 935. The cap holder 935 is rotatably held by an arm 937 integrally extending from a cylinder (not illustrated). The cylinder has a piston (not illustrated) in its interior, and a negative pressure can be applied to the interior of the cylinder by driving a piston rod. The cap 933 has a flexible joint integrally formed with the cap 933. This joint is press fitted into a joint provided in the cylinder with an interference, whereby the cylinder and cap 933 are joined to each other in a sealed state. A method of bringing the cap 933 into contact under pressure with the recording head 901 and releasing the contact will hereinafter be described. The cap 933 integrally held by the cap holder 935 as described above is joined to the cylinder in the sealed state, and the cap holder 935 is rotatably held by the cylinder arm 937 against the cylinder. A cylinder control part 939 is integrally formed with the cylinder, and the tip of the cylinder control part 939 comes into contact with a cam 943 of a pump cam gear 941 which is rotatably held by the base 921.

Accordingly, the rotation of the cylinder is controlled by the cam 943 of the pump cam gear 941 through the cylinder control part 939. More specifically, the cylinder control part 939 vertically moves along the cam 943 of the pump cam gear 941, whereby capping and decapping of the cap 933 to the recording head 901 through the cylinder become feasible. The pump cam gear 941 and a drive transmission part held by the base 921 are provided at a right edge of the base 921 away from the recording paper-feeding path. The pump cam gear 941 may be selectively joined to an LF gear 945 press fitted on the feed roller 929, so that the drive of the paper feed motor (not illustrated) can be transmitted to the LF gear 945 through a gear train (not illustrated) and to the pump cab gear 941 by conducting a clutching operation (not illustrated) according to the movement of the carriage 905. As described above, in the pumping mechanism part, the cap 933 can be brought into contact under pressure with the recording head 901 by interposing a cap spring held by the base 921 between the base 921 and the cap holder 935. Accordingly, the recording head 901 can be capped to prevent the drying of nozzles when no recording is conducted, and moreover the pump can be operated during the capping operation to suck inks from the nozzles of the recording head 901 when ejection fails due to bubbles generated in the nozzles and dust adhered to the nozzles, thereby normalizing the ejection.

Figure 3:
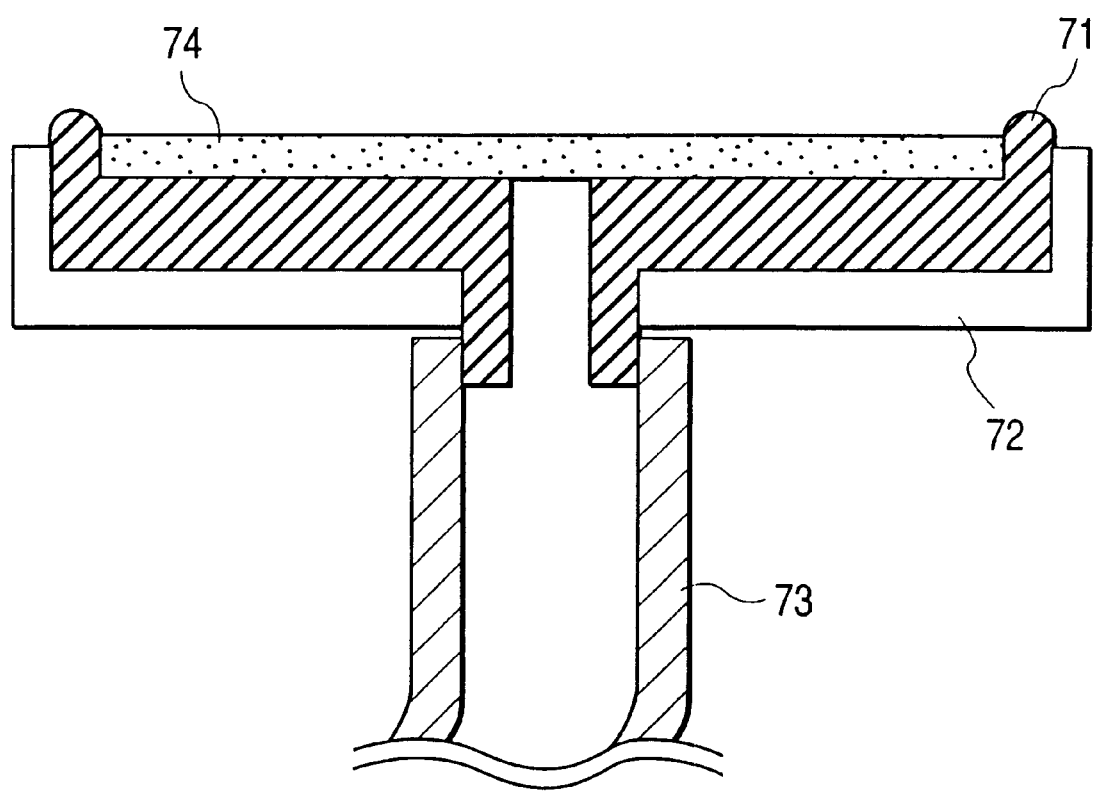
FIG. 3 is a detail view illustrating a section of a cap.

FIG. 3 is a detail view illustrating a section of the cap 933. In FIG. 3, reference numeral 71 indicates cap rubber. The upper part in the drawing comes into contact with ejection opening faces of a plurality of ink-jet heads. In this drawing, a suction port is lactated at the center of the cap rubber 71, so that inks sucked into the cap rubber 71 do not remain there, and inks can be evenly sucked from nozzles located at the center and both ends. Reference numerals 72 and 73 designate a cap cover for holding the cap rubber 71 and a tube for pumping connected to the cap rubber 71, respectively. A suction pump (not illustrated) is communicated with the pumping tube. Reference numeral 74 indicates an in-cap absorbing member.

(Waste Ink-absorbing Member)

The waste ink-absorbing member will now be described with reference to FIG. 5. The waste inks sucked by the above-described pumping mechanism part from the recording head 901 through the cap 933 enter the cylinder and discharged from an end of the cylinder by the action of the piston (not illustrated). The end of the cylinder is inserted into the base 921 and rotatably held by the base 921. The other end of the cylinder is rotatably held by the base 921 through a cylinder cap gear (not illustrated). Therefore, the whole pumping mechanism part comes to be rotatably held by the base 921. An absorbing member 947 for cylinder is inserted into the end of the cylinder from which the waste inks are discharged. Since the absorbing member 947 for cylinder is required to have performance for effectively discharging the waste inks into the outside, a material having good ink-transmitting ability is selected. The absorbing member is thus formed by, for example, foamed sponge. The absorbing member 947 for cylinder is put among waste ink-absorbing members 949, 951 and 953 provided in the base 921 and kept in contact under pressure with them. Accordingly, the waste inks within the cylinder are transferred from the absorbing member 947 for cylinder to the waste ink-absorbing members 949, 951, 953 and 955. The waste ink-absorbing members 949, 951, 953 and 955 are held in the interior of the base as illustrated in FIG. 5. Since the base 921 has the pinch roller and a paper discharge roller, its section is not uniform. Accordingly, it is preferable to contain a plurality of waste ink-absorbing members within the base 921 in order to efficiently arrange them and ensure greater waste ink-absorbing capacity.

It is preferable to use a material having high ink-retaining capacity for the waste ink-absorbing members 949, 951, 953 and 955. Examples of a material for the ink-absorbing members include laminated paper sheets, absorbing members comprising an absorbing polymer, a high-density fibrous structure such as felt, foam-molded materials of polyurethane, cellulose, PVA, EVA, etc., and the above absorbing members comprising a water-absorbing polymer such as acrylic acid-grafted starch, acrylate-grafted starch, vinyl alcohol-acrylic acid block copolymer, vinyl alcohol-acrylate block copolymer, crosslinked polyacrylic acid, crosslinked polyacrylate, modified PVA, polystyrene-sulfonic acid, cellulose ether or carboxymethyl cellulose. A waste ink-absorbing member comprising such a material is made by, for example, a cutting die.

In this embodiment, the waste ink-absorbing member has been constructed by 4 members (949, 951, 953 and 955), and the absorbing member 947 for cylinder has been so arranged and constructed that it is put among the waste ink-absorbing members 949, 951 and 953 and kept in contact under pressure with them. However, the construction and arrangement of the waste ink-absorbing members are not limited thereto.

According to the present invention, as described above, high-quality black prints excellent in water fastness can be provided. In addition, waste inks produced by preliminary ejection of inks and a recovery operation such as recovery by suction or pressurization, which are necessary for recording, can be reliably recovered without staining the interior of the apparatus, and high-quality recording can be stably performed over a long period of time.

The present invention will hereinafter be described more specifically by the following Examples and Comparative Examples. However, the present invention is not limited to and by these examples so far as the subject matter of the present invention is not overstepped. Incidentally, all designations of "part" or "parts" and "%" as will be used in the following examples mean part or parts by weight and % by weight unless expressly noted.

PREPARATION EXAMPLE 1

(Pigment Dispersion 1)

To a solution of 5 g of concentrated hydrochloric acid in 5.3 g of water were added 1.58 g of anthranilic acid at 5° C. The mixture was stirred in an ice bath, thereby always holding it at 10° C. or lower. In this state, a solution with 1.78 g of sodium nitrite dissolved in 8.7 g of water at 5° C. was added to the mixture. After stirring the resultant mixture for 15 minutes, 20 g of carbon black having a surface area of 320 m$^2$/g and a DBP oil absorption of 120 ml/100 g were further added to the mixture with stirring. The resultant mixture was stirred for additional 15 minutes. The resultant slurry was filtered through Toyo Filter Paper No. 2 (product of Advantes Co.), and the resultant pigment particles were fully washed with water and dried in an oven controlled to 110° C. Additional water was added to the dry pigment to prepare an aqueous dispersion of the pigment having a pigment concentration of 10%. The above-described process was followed to introduce a —Ph—COONa group into the surface of the carbon black.

(Pigment Dispersion 2)

An aqueous dispersion of a pigment having a pigment concentration of 10% was prepared by substituting —COONH$_4$ for the terminal of the —Ph—COONa group bonded to the surface of the carbon black in Pigment Dispersion 1 prepared above by an ion-exchange process.

PREPARATION EXAMPLE 2

(Black Ink 1)

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 1 | 30 parts |
| Glycerol | 7.5 parts |
| Ethylene glycol | 7.5 parts |
| Ethylene oxide adduct of acetylene glycol (Acetylenol EH, trade name, a product of Kawaken Fine Chem. Co., Ltd) | 0.2 parts |
| Water | 54.8 parts. |
| (pH: 7.5) | |

(Yellow Ink 1)

The following components were mixed and thoroughly stirred into a solution. The resultant solution was then filtered under pressure through a microfilter (product of Fuji Photo Film Co., Ltd.) having a pore size of 0.2 μm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| 10% Aqueous solution of sodium hydroxide | 0.04 parts |
| C.I. Direct Yellow 86 | 3 parts |
| Water | 73.46 parts. |
| (pH: 10.1) | |

(Magenta Ink 1)

The following components were mixed and thoroughly stirred into a solution. The resultant solution was then filtered under pressure through a microfilter (product of Fuji Photo Film Co., Ltd.) having a pore size of 0.2 μm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| 10% Aqueous solution of sodium hydroxide | 2 parts |
| Exemplified Compound No. 16 | 3 parts |
| Water | 71.5 parts. |
| (pH: 9.7) | |

(Cyan Ink 1)

The following components were mixed and thoroughly stirred into a solution. The resultant solution was then filtered under pressure through a microfilter (product of Fuji Photo Film Co., Ltd.) having a pore size of 0.2 μm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| 10% Aqueous solution of sodium hydroxide | 0.04 parts |
| C.I. Direct Blue 199 | 3 parts |
| Water | 73.46 parts. |
| (pH: 10.2) | |

(Black Ink 2)

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 2 | 30 parts |
| Glycerol | 7.5 parts |
| Ethylene glycol | 7.5 parts |
| Ethylene oxide adduct of acetylene glycol (Acetylenol EH, trade name) | 0.2 parts |

-continued

| | |
|---|---|
| Water (pH: 7.5) | 54.8 parts. |

(Yellow Ink 2)

The following components were mixed and thoroughly stirred into a solution. The resultant solution was then filtered under pressure through a microfilter (product of Fuji Photo Film Co., Ltd.) having a pore size of 0.2 µm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| C.I. Direct Yellow 86 | 3 parts |
| Water (pH: 7.5) | 73.5 parts. |

(Magenta Ink 2)

The following components were mixed and thoroughly stirred into a solution. The resultant solution was then filtered under pressure through a microfilter (product of Fuji Photo Film Co., Ltd.) having a pore size of 0.2 µm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| Exemplified Compound No. 16 | 3 parts |
| Water (pH: 7.0) | 73.5 parts. |

(Cyan Ink 2)

The following components were mixed and thoroughly stirred into a solution. The resultant solution was then filtered under pressure through a microfilter (product of Fuji Photo Film Co., Ltd.) having a pore size of 0.2 µm, thereby preparing an ink according to the present invention.

| | |
|---|---|
| Urea | 7.5 parts |
| Acetylenol EH | 1 part |
| Diethylene glycol | 7.5 parts |
| Glycerol | 7.5 parts |
| C.I. Direct Blue 199 | 3 parts |
| Water (pH: 7.5) | 73.5 parts. |

EXAMPLE 1

An ink set was prepared in accordance with the following combination:

Black Ink 1,
Yellow Ink 1,
Magenta Ink 1 and
Cyan Ink 1.

EXAMPLE 2

An ink set was prepared in accordance with the following combination:

Black Ink 2,
Yellow Ink 1,
Magenta Ink 1 and
Cyan Ink 1.

COMPARATIVE EXAMPLE 1

An ink set was prepared in accordance with the following combination:

Black Ink 1,
Yellow Ink 2,
Magenta Ink 2 and
Cyan Ink 2.

COMPARATIVE EXAMPLE 2

An ink set was prepared in accordance with the following combination:

Black Ink 2,
Yellow Ink 2,
Magenta Ink 2 and
Cyan Ink 2.

Each of the ink sets obtained in Examples 1 and 2 and Comparative Examples 1 and 2 was charged into an ink-jet recording apparatus, BJC-4000, (trade name, manufactured by Canon Inc.) having an On-Demand type multi-recording head which ejects an ink by applying thermal energy in response to recording signals to the ink, to conduct printing, thereby evaluating each black ink as to water fastness. In addition, a cap for BJC-4000 was used to conduct the following evaluation. Incidentally, BJC-4000 is so constructed that all ejection openings for the black, yellow, magenta and cyan inks are capped with one cap, and all the 4 color inks are collectively sucked to preserve 4 waste color inks in a common waste ink-absorbing member. The results are shown in Table 1.

(Evaluation Method)

Ability to Absorb Waste Ink in Cap

The above-described cap was used, and each 0.3 ml of the inks were dropped from the height of 5 cm above the cap on the same position of the in-cap absorbing member in the cap in order of a black ink→a yellow ink→a magenta ink→a cyan ink at intervals of 30 minutes under the environment of 35° C. and 10% humidity until the total amount of the inks dropped reached 60 ml.

The ink-absorbing ability of the cap was evaluated in accordance with the following standard:

A: Observed no carbon remaining on the in-cap absorbing member;

B: Observed slight carbon remaining on the in-cap absorbing member;

C: Observed carbon remaining on the in-cap absorbing member;

D: Observed carbon remaining in the form of a lump on the in-cap absorbing member;

| | Ability to absorb waste ink |
|---|---|
| EXAMPLE 1 | A |
| EXAMPLE 2 | A |
| COMP. EXAMPLE 1 | B |
| COMP. EXAMPLE 2 | C |

The black ink of the ink set according to Example 2 was used to print a 100%-solid black print line of 190 mm×3 mm on plain paper, PB PAPER (trade name, product of Canon Inc.). Fifty-five minutes after the printing, the paper was inclined at an angle of 45° to drop 0.75 ml of tap water on the paper by a pipeter in such a manner that the water runs on the black line. The condition of the black line at this time was visually observed to evaluate the black ink as to water fastness. As a result, some staining and ink running were observed at the portions on which the tap water was dropped, but the ink was practicable without problems.

EXAMPLE 3

(Black Ink 3)

Black Ink 3 was prepared in the same manner as in the preparation of Black Ink 1 except that the following components were used.

| | |
|---|---|
| Pigment Dispersion 2 | 30 parts |
| Ammonium benzoate | 1 part |
| Ethylene oxide adduct of acetylene glycol (Acetylenol EH, trade name; product of Kawaken Fine Chemicals Co., Ltd.) | 0.15 parts |
| Glycerol | 5 parts |
| Water | 52.85 parts |
| (pH: 7.5) | |

An ink set was prepared in accordance with the following combination:

Black Ink 3,

Yellow Ink 1,

Magenta Ink 1 and

Cyan Ink 1.

The ink set was used to evaluate it as to the waste ink-absorbing ability in the same manner as in Examples 1 and 2. As a result, the result corresponding to the rank A was observed. The ink set was used to conduct the following evaluation.

The black ink of the ink set was used to conduct printing on the following 5 kinds of paper, thereby visually observing whether feathering of characters occurred at this time or not. As a result, excellent results that feathering of characters scarcely occurred were yielded on all the 5 kinds of paper.

a: PPC PAPER NSK (trade name, product of Canon Inc.), b: PPC PAPER NDK (trade name, product of Canon Inc.), c: PPC PAPER 4024 (trade name, product of Xerox Co., Ltd., d: PPC PAPER PLOVER BOND (trade name, product of Fox River Co.)

e: CANON PPC PAPER (product of Neusiedler Co.).

The black ink of the ink set was used to print a 100%-solid black print sample in a region of 30 mm×30 mm on the 5 kinds of paper. At this time, the optical density of the image on each paper was determined by a Macbeth densitometer. As a result, a difference in optical density among the images formed on the 5 kinds of paper was 0.1 or lower.

The ink set was used, and a region of a 10-cm square of each of the 5 kinds of paper was divided into 5×5 grids to alternately eject the black ink and the color inks on the respective grids, thereby visually observing whether bleeding of the black ink and the color ink occurred at boundaries between the portions applied with the black ink and the portions applied with the color inks or not. As a result, a boundary line between the grids was clear on each paper, and bleeding or color mixing was scarcely observed.

What is claimed is:

1. An ink set comprising a black ink and a color ink and being suitable for an ink-jet recording apparatus comprising a common recovering means for a black ink-ejecting means and a color ink-ejecting means, wherein the black ink comprises particles of self-dispersing carbon black having at least one anionic hydrophilic group at the surface thereof in an aqueous medium, and the color ink is an aqueous ink having higher pH than that of the black ink.

2. The ink set according to claim 1, wherein the black ink comprises particles of self-dispersing carbon black having at least one anionic hydrophilic group at the surface thereof, and at least one salt selected from the group consisting of $(M1)_2SO_4$, $CH_3COO(M1)$, $Ph—COO(M1)$, $(M1)NO_3$, $(M1)Cl$, $(M1)Br$, $(M1)I$, $(M1)_2SO_3$ and $(M1)_2CO_3$, wherein M1 is alkali metal, ammonium or organic ammonium, and Ph is a phenyl group, in an aqueous medium.

3. The ink set according to claim 2, wherein the salt is contained in a range of from 0.05 to 10% by weight based on the total weight of the ink.

4. The ink set according to claim 3, wherein the salt is contained in a range of from 0.05 to 5% by weight based on the total weight of the ink.

5. The ink set according to claim 1, wherein the hydrophilic group is selected from the group consisting of —COOM, —SO$_3$M, —PO$_3$HM, and —PO$_3$M$_2$, wherein M is hydrogen, alkali metal, ammonium or organic ammonium.

6. The ink set according to claim 1, wherein the hydrophilic group is bonded directly to the surfaces of the carbon black particles.

7. The ink set according to claim 1, wherein the hydrophilic group is bonded to the surfaces of the carbon black particles through an atomic group.

8. The ink set according to claim 7, wherein the atomic group is selected from the group consisting of alkylene groups having 1 to 12 carbon atoms, a substituted or unsubstituted phenylene group, and a substituted or unsubstituted naphthylene group.

9. The ink set according to claim 1, wherein the hydrophilic group has ammonium as a counter ion.

10. The ink set according to claim 1, wherein the color ink comprises an acid dye or direct dye as a coloring material.

11. The ink set according to claim 1, wherein the color ink comprises a pigment as a coloring material.

12. The ink set according to claim 1, wherein the color ink comprises at least one compound of a hydroxide and an alkaline metal salt.

13. A recording unit comprising at least two ink-containing portions containing a black ink and a color ink respectively, and an ink-jet head for ejecting the black ink and the color ink respectively, the recording unit being for an ink-jet recording apparatus provided with a common recovery means for a black ink-ejecting orifice and a color ink-ejecting orifice of the ink-jet head, wherein the black ink comprises particles of self-dispersing carbon black having at least one anionic hydrophilic group at the surface thereof in an aqueous medium and having a prescribed pH, and the color ink is an aqueous ink having higher pH than the prescribed pH of the black ink.

14. An ink cartridge suitable for use in an ink-jet recording apparatus provided with an ink-jet head ejecting a black ink and a color ink, and a common recovering means for a black ink-ejecting orifice of the ink-jet head and a color ink-ejecting orifice of the ink-jet head comprising at least two ink-containing portions containing the black ink and the color ink, respectively, wherein the black ink comprises particles of self-dispersing carbon black having at least one anionic hydrophilic group at the surface thereof in an aqueous medium and has a prescribed pH, and the color ink is an aqueous ink having higher pH than the prescribed pH of the black ink.

15. An ink-jet recording apparatus comprising a recording unit which has at least two ink-containing portions respectively containing at least two inks of different colors and a head portion for ejecting the inks fed from the ink-containing portions, a cap for capping together ejection opening faces for said at least two inks provided in the head portion, a pump for sucking the inks in the head portion through the cap, and an ink-absorbing member for preserving said at least two inks sucked by the pump, wherein said two inks of different colors are a black ink comprising self-dispersing carbon black having at least one anionic hydrophilic group at the surface thereof in an aqueous medium, and an aqueous color ink having higher pH than that of the black ink.

16. An ink-jet recording apparatus comprising a plurality of ink cartridges separately containing at least two inks of different colors, a head portion, in which the ink cartridges are detachably installed and from which the inks contained in ink-containing portions of the respective ink cartridges are ejected, a cap for capping together ejection opening faces for said at least two inks provided in the head portion, a pump for sucking the inks in the head portion through the cap, and an ink-absorbing member for preserving said at least two inks sucked by the pump, wherein said two inks of different colors are a black ink comprising self-dispersing carbon black having at least one anionic hydrophilic group at the surface thereof in an aqueous medium, and an aqueous color ink having higher pH than that of the black ink.

17. The ink-jet recording apparatus according to claim 15 or 16, wherein the black ink comprises particles of self-dispersing carbon black having at least one anionic hydrophilic group at the surface thereof, and at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 is alkali metal, ammonium or organic ammonium, and Ph is a phenyl group, in an aqueous medium.

18. The ink-jet recording apparatus according to claim 17, wherein the salt is contained in a range of from 0.05 to 10% by weight based on the total weight of the ink.

19. The ink-jet recording apparatus according to claim 18, wherein the salt is contained in a range of from 0.05 to 5% by weight based on the total weight of the ink.

20. The ink-jet recording apparatus according to claim 15 or 16, wherein the hydrophilic group is selected from the group consisting of $-COOM$, $-SO_3M$, $-PO_3HM$ and $-PO_3M_2$, wherein M is hydrogen, alkali metal, ammonium or organic ammonium.

21. The ink-jet recording apparatus according to claim 20, wherein the hydrophilic group has ammonium as a counter ion.

22. The ink-jet recording apparatus according to any one of claims 15 or 16, wherein the hydrophilic group is bound directly to the surfaces of the carbon black particles.

23. The ink-jet recording apparatus according to any one of claims 15 or 16, wherein the hydrophilic group is bound to the surfaces of the carbon black particles through an atomic group.

24. The ink-jet recording apparatus according to claim 23, wherein the atomic group is selected from the group consisting of alkylene groups having 1 to 12 carbon atoms, a substituted or unsubstituted phenylene group, and a substituted or unsubstituted naphthylene group.

25. The ink-jet recording apparatus according to claim 15 or 16, wherein the color ink comprises an acid dye or direct dye as a coloring material.

26. The ink-jet recording apparatus according to claim 15 or 16, wherein the color ink comprises a pigment as a coloring material.

27. The ink-jet recording apparatus according to claim 15 or 16, wherein the color ink comprises at least one compound of a hydroxide and an alkaline metal salt.

28. A method for relieving the formation of solids within a common recovery-system unit of an ink-jet recording apparatus which is provided with a black ink comprising self-dispersing carbon black having at least one anionic hydrophilic group at the surface thereof in an aqueous medium and an aqueous color ink, the method comprising a step of sucking the black ink and the color ink at the same time with the common recovery system unit, wherein the color ink has a pH higher than that of the black ink.

* * * * *

UNITED STATES PATENT AND TRADEMARK OFFICE
CERTIFICATE OF CORRECTION

PATENT NO.     : 6,425,662 B1
DATED          : July 30, 2002
INVENTOR(S)    : Hisashi Teraoka et al.

It is certified that error appears in the above-identified patent and that said Letters Patent is hereby corrected as shown below:

Title page,
Item [56], U.S. PATENT DOCUMENTS, insert
-- 6,050,671    4/2000          Rotering --.

Column 2,
Line 10, "opining" should read -- opening --.

Column 3,
Line 10, "by" should read -- for --.

Column 5,
Line 5, "still further" should read -- a still further --.
Line 23, "in-jet" should read -- ink-jet --.
Line 37, "detail" should read -- detailed --.
Line 42, "a" should read -- an --.

Column 7,
Line 13, "the those" should read -- those --.

Signed and Sealed this

Twenty-seventh Day of May, 2003

JAMES E. ROGAN
*Director of the United States Patent and Trademark Office*